Figure 1:
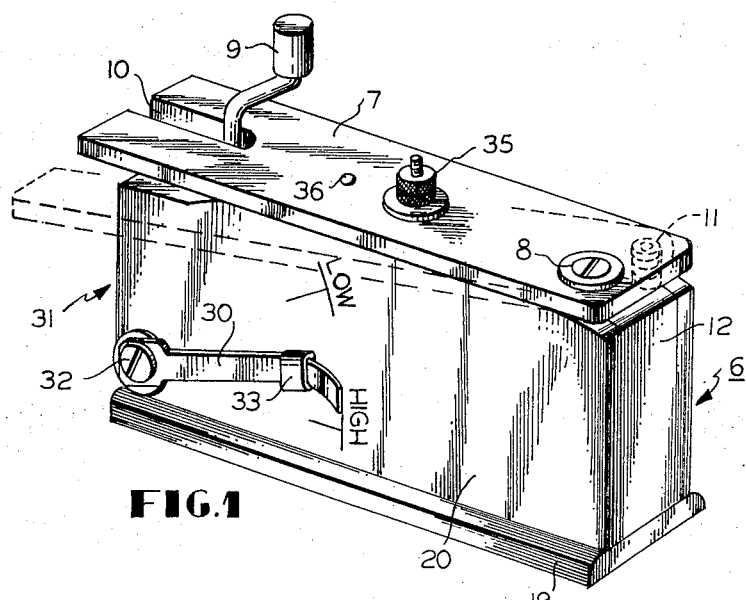

United States Patent [19]
Pulley

[11] 3,793,767
[45] Feb. 26, 1974

[54] CRANK OPERATED REEDLESS TURKEY CALL

[76] Inventor: John Lindell Pulley, Centerville, Mo. 63633

[22] Filed: Oct. 25, 1972

[21] Appl. No.: 300,592

[52] U.S. Cl. ............................................. 46/189
[51] Int. Cl. ............................................ A63h 5/00
[58] Field of Search ............................. 46/174, 189

[56] References Cited
UNITED STATES PATENTS

| | | | |
|---|---|---|---|
| 2,047,784 | 7/1936 | Krakowski | 46/174 |
| 2,511,403 | 6/1950 | Fleener | 46/189 |
| 2,606,401 | 8/1952 | Boatwright | 46/189 |
| 3,100,948 | 8/1963 | Tax | 46/189 |

Primary Examiner—Louis G. Mancene
Assistant Examiner—Robert F. Cutting
Attorney, Agent, or Firm—Laurence R. Brown

[57] ABSTRACT

A crank operated reedless turkey call has a vibratable sounding board as one wall of a box with an extending edge accessible to rub against the lower surface of a spring biased lid pivoted at one corner of the box and moved by a crank over a predetermined degree of rubbing motion. The sound is produced over half of the crank cycle during the frictional contact between the edge and the lid when the lid is moved in the one direction toward the inside of the box and no sound is produced as it is returned in the opposite direction.

12 Claims, 5 Drawing Figures

PATENTED FEB 26 1974                                    3,793,767

CRANK OPERATED REEDLESS TURKEY CALL

This invention relates to game calls and more particularly it relates to turkey calls.

If a game call is used it must provide a correct sound, and subtle changes in tone will make the call ineffective. In particular, the romantic yelp of a hen turkey is difficult to produce accurately and consistently.

Conventional turkey calls are dependent upon the skill and art of the caller. Thus, obtaining required tone variations with reed structures is difficult and must be attained by artfully modifying air flow patterns to obtain variations of tone and call overtones. Furthermore, reeds are limited to particular resonance tones and are seriously affected by external conditions such as humidity and temperature and have a tendency to become fouled. The air flow must be varied expertly by the caller using such devices with great skill to accurately and consistently reproduce a mating call of a hen turkey. If a caller is nervous or excited or is in an uncomfortably cold environment, or the like, it generally affects the nature of the sound.

When two sounding boards are rubbed together they require a subtle movement path, exactly defined pressures and critical speeds to produce proper tones, requiring extraordinary skill on the part of the caller. Thus, the prior art is deficient in providing a turkey call that simply and consistently produces an authentic hen turkey yelp.

Accordingly, it is a primary object of the invention to provide an improved turkey call.

A further object of the invention is to provide a mechanical turkey call that is operated consistently and repeatedly.

Another object of the invention is to provide a turkey call that can be operated without special art or skill by an inexperienced caller by simply turning a crank.

Therefore, in accordance with the invention a crank operated reedless turkey call is provided. A sounding board is mounted as a wall of a box and a lid is suspended to pass its inner surface frictionally over the edge of the wall in a defined pattern of motion creating in the sounding board vibrations to simulate a hen turkey call. The call is controlled simply through an operating cycle by rotary manual motion of a crank to move the lid about a pivot point on a corner of the box through a predetermined movement arc.

Figure 2:
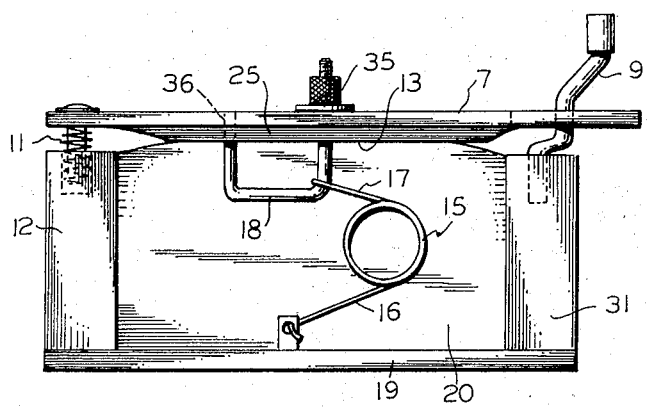
Figure 4:
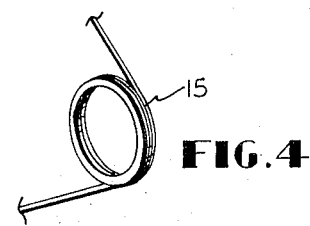
Figure 5:
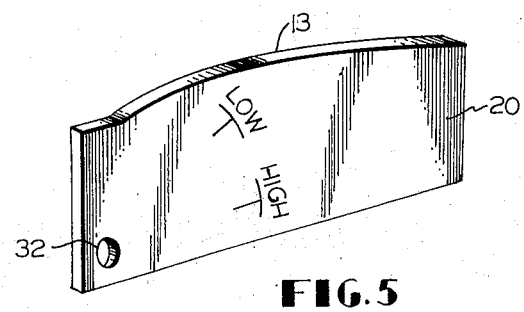
Figure 3:
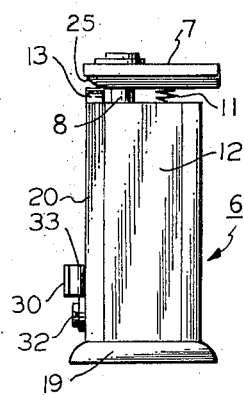

Further features, objects and advantages of the invention will be found throughout the following specification and accompanying drawings, wherein:

FIG. 1 is a perspective view of a box-shaped, crank-operated turkey call structure afforded by the invention, FIG. 2 is a rear elevational view of the structure of FIG. 1 with the rear panel removed, FIG. 3 is a right end elevation view, without the crank, of the call structure showing the lid suspension means, FIG. 4 is a perspective view of a portion of the spring structure of FIG. 2, and FIG. 5 is a perspective view of the sounding board panel constituting the front wall of the box of FIG. 1.

Referring now more specifically to the drawing figures, the turkey call embodiment afforded by this invention is in the form of a box-like body 6, having a lid 7 pivotable about pin 8 through an arc illustrated by the phantom view of the lid in FIG. 1 by means of crank 9 engaging slot 10 in the lid 7.

A three position vertical suspension structure for the lid 7 comprises (1) coil spring 11 embedded in an end wall 12 of the box 6 to push the lid 7 upwardly, (2) coil spring 15 anchored by one circumferentially extending end 16 to the bottom 19 of the box and by another such end 17 to the movable anchor structure 18 in the lid 7, and (3) a peaked front panel edge 13 accessible at the top front panel of the box 6. The crank 9 and pivot pin 8 permits free vertical movement of the lid, and thereby serves only to confine the lid 7 through a generally lateral degree of movement constituting an arc about pivot pin 8.

The front panel wall 20 of the box constitutes the vibrating sounding board member which produces the sound, and the rear panel wall member 21 (removed in FIG. 2) serves only as a closure member and does not contact the lid 7 throughout its movement arc.

The under surface 25 of the lid is curved in the embodiment shown in FIG. 2, to rasp over the peaked edge 13 of the sounding board member 20 as the crank is turned and the lid is pivoted, thereby frictionally introducing in the sounding board 20 the vibrations realistically producing a hen turkey call. The surface 25 may be chalked or rosined to assure a good frictional contact. The lid 7 and sounding board panel 20 may be made of hardwood such as maple or walnut, and the sounding board panel 20 may have typical dimensions of 2 inches by 5 inches by 1/8 inch. The sounding panel 20 may be glued or otherwise affixed in position at the other box wall and bottom edges of similar material.

In order to modify the amplitude of the call an adjustable sound control member 30 is pivoted about the rearmost end panel 31 at pivot pin position 32. This member 30 comprises a leaf spring with a damping member such as a flexible plastic damper pad 33 held in spring biased position in contact with the sounding board 20. This serves to damp the sound to a degree determined by the distance from the bottom 19 that the damper pad 33 engages the sounding board panel 20, and thereby produces an amplitude adjustment over the pivot arc of the sound control member 30.

The pull down suspension spring 15 serves also as a tuning member along with the vertically positionable U-shaped anchor member 18, which is manually adjustable by knurled nut 35. The anchor member 18 freely moves vertically through hole 36 in lid 7, and thus serves to adjust the pull down tension afforded by spring 15. This increases or decreases the surface contact pressure of the contoured under surface 25 of lid 7 upon the accessible peaked edge 13 of the sounding board panel wall member 20, and thus serves to tune the call. The structure of coil spring 15 permits this pressure to be substantially constant over the lateral movement of the lid through its pivot arc.

The contour of the lower lid surface 25 may be rounded or shaped to vary the tones and overtones of the call as it scrapes or rasps over the sounding edge 13 to produce the basic call tones.

Crank 9 serves therefore to consistently and uniformly reproduce the call time after time as formed by the sounding board-lid reaction surfaces by moving the lid through its pivot arc. The sound is produced only by motion of the lid in the direction of the center of the box and not on the return of the lid so that a single call is made for one complete revolution of crank 9. Thus, basically the lower lid operating surface 25 scrapes across the inner edge 13 of sounding board panel wall member 20 on the pivot swing of the lid 7 toward the center of the box where the lid 7 may be considered to substantially close the box as shown in FIGS. 1 and 3. Primarily it is important that the two wooden sounding members 7, 20 are rubbed together over a fixed path of known configuration by a mechanism such as crank 9, and the box-like configuration of the illustrated embodiment is a convenient and preferred manner of assembling the call.

What is claimed is:

1. A reedless sound producing device such as a turkey call comprising in combination a first member disposed as a wall member of a box-like structure comprising a vibratable sounding board having an accessible edge extending beyond the remaining box-walls, a movable member disposed substantially as a box lid pivoted to move across said accessible edge with a frictional surface adapted to rub on said edge when the member is pivoted to cause vibrations of said sounding board, suspension means for holding said surface in frictional contact with said edge over a predetermined degree of movement, and a mechanism arranged to pass said movable member through said predetermined degree of movement with said surface rubbing over said accessible edge to thereby produce a predetermined sound such as a turkey call.

2. A device as defined in claim 1, wherein said mechanism is a crank adapted to move said movable member about said pivot arc.

3. A device as defined in claim 2, wherein the crank is pivoted in a wall of said box and the movable member includes a slot engaged by the crank to pivot the movable member through said arc.

4. A device as defined in claim 1, wherein said suspension means comprises a spring member holding said movable member against said accessible edge.

5. A device as defined in claim 4, including a tuning device comprising means for adjusting the force of said spring member against said movable member.

6. A device as defined in claim 4, wherein the spring comprises a coil spring having two circumferentially extending ends, means anchoring one such end on the bottom of said box and an adjustably positionable member anchoring the other such end to the lid.

7. A device as defined in claim 1, including a variable sound control member comprising a spring biased element having thereon damper means positionable to place the damper means in contact with different positions on said sounding board.

8. A device as defined in claim 1, wherein said sounding board is a wooden panel.

9. A device as defined in claim 7, wherein said movable member is wooden with a curved contact surface having a layer of friction producing substance thereon to contact said accessible edge during said degree of movement.

10. A device as defined in claim 1, wherein said lid member is pivoted about one corner of said box-like structure, and said suspension means comprises a first spring holding the lid member away from said box-like structure and a second spring holding the lid in contact with said edge.

11. A device as defined in claim 10, wherein said first spring is located in a wall of said box adjacent said pivot corner.

12. A device as defined in claim 1, including a tuner mechanism comprising means for adjusting contact pressure between said accessible edge and said movable member over said degree of movement.

* * * * *